E. ARNOLD & J. L. LA COUR.
ARRANGEMENT FOR STARTING AND REGULATING THE SPEED OF ALTERNATING CURRENT MOTORS.
APPLICATION FILED MAY 15, 1905.
963,678.
Patented July 5, 1910.
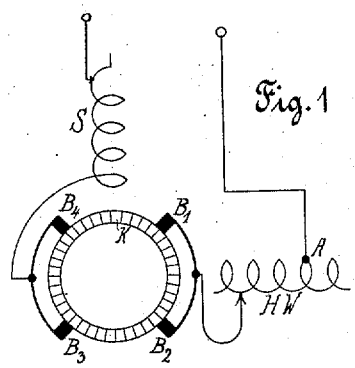
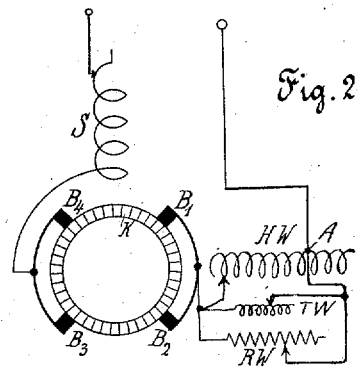
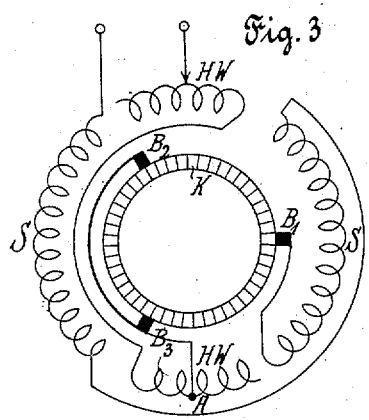
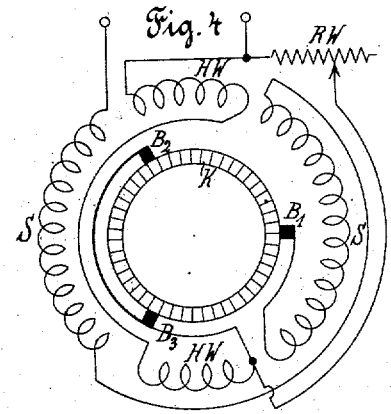
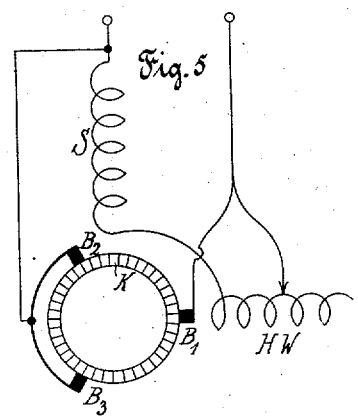
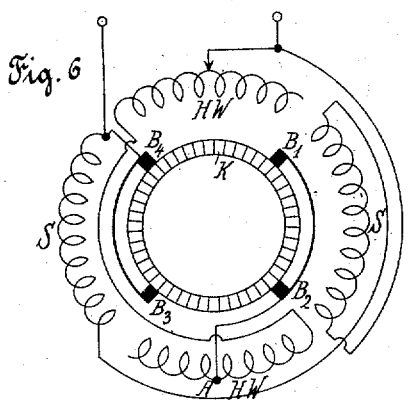

UNITED STATES PATENT OFFICE.

ENGELBERT ARNOLD, OF KARLSRUHE, GERMANY, AND JENS LASSEN LA COUR, OF EDINBURGH, SCOTLAND.

ARRANGEMENT FOR STARTING AND REGULATING THE SPEED OF ALTERNATING-CURRENT MOTORS.

963,678.  Specification of Letters Patent.  Patented July 5, 1910.

Application filed May 15, 1905. Serial No. 260,521.

*To all whom it may concern:*

Be it known that we, ENGELBERT ARNOLD, a subject of the German Emperor, and a resident of Karlsruhe, Grand Duchy of Baden, Germany, and JENS LASSEN LA COUR, a subject of the King of Denmark, and a resident of Edinburgh, Scotland, have invented certain new and useful Improvements in Arrangements for Starting and Regulating the Speed of Alternating-Current Motors, of which the following is a specification.

The following invention relates to that class of compensated single phase commutator motors whose rotor winding is formed into two circuits, one of which is short circuited by brushes bearing on the commutator and has substantially the same magnetic axis as the stator winding, and the other of which is supplied by brushes with current from the source and has its magnetic axis displaced ninety degrees from the former. The latter rotor circuit excites the field of the motor.

In order to start the motor and to regulate its speed, this magnetic field has to be varied independently from the current flowing in the other circuits and this is done in our invention by disposing an auxiliary winding upon the stator, displaced ninety degrees from the above mentioned stator winding and having therefore the same magnetic axis as the exciting circuit of the rotor. Thus both the rotor winding and the auxiliary stator winding coöperate in the excitation of the magnetic field and in varying the number of ampere turns of the auxiliary winding the strength of the field may be varied.

Our invention will be best understood by reference to the following drawings, in which, Figure 1 shows a series motor embodying our invention and having main and auxiliary stator coils with means for varying the number of active turns in the auxiliary coil; Fig. 2 shows a similar series motor with a variable impedance in shunt to the auxiliary coil; Figs. 3 and 4 the main and auxiliary stator coils as distributed windings; Figs. 5 and 6 illustrate our invention applied to a compensated shunt motor, the former showing the auxiliary stator coil connected in series with the main stator coil, and the latter having the auxiliary stator coil in series with the rotor winding.

Referring to Fig. 1, a series motor is shown diagrammatically having two pairs of brushes, $B_1$ $B_2$ and $B_3$ $B_4$, on the commutator K and short-circuit connections between them. These brushes are used to supply the rotor with current and are connected in series with the main stator winding S and the auxiliary winding HW upon the stator. The connection between the commutator brushes and the auxiliary winding is shown with a movable contact, as indicated by the arrow, which permits as many turns of the auxiliary winding as desired to be put in circuit. As is well known to those skilled in the art the rotor winding which is not short circuited by the brushes forms the exciting circuit of the motor which produces the exciting or cross field, while the short circuited section of the rotor winding forms the compensating circuit. The ampere turns of the auxiliary winding may have the same direction as the ampere turns of the exciting circuit of the rotor, or they may have the opposite direction. In the first case the motor will have a strong cross field and a large counter electromotive force of self induction will be induced in the rotor winding and in the auxiliary winding. Since both of these windings are connected in series with the main winding, the starting current of the motor will be reduced to an admissible value, without diminishing the starting torque because the cross field is strong.

During the starting period of the motor the auxiliary winding HW is gradually cut out; as the motor speeds up the reactance of the rotor diminishes and the power factor will rise, but the reactance of the rotor disappears only at synchrononous speed. If the motor is required to run at all loads at a speed below the synchronism and still have a high power factor, the rotor reactance must be compensated by having the auxiliary winding switched in opposition to the rotor winding. This connection is indicated in Fig. 1 and is understood to be of general application to either shunt or series types. In Fig. 1, both ends of the auxiliary winding are free and a point A of the same is connected with the power terminal. When the movable contact has passed the point A, the ampere turns of the winding lying between A and the contact are opposite to those of the rotor winding.

In a practical arrangement the auxiliary winding is best divided into a certain number of coils which can be connected up in different ways, in order to vary both the number and the direction of the ampere turns of the auxiliary winding. When the motor is connected to a high tension source, either the whole power can be transformed to a convenient tension or only that part of the same which is required by the rotor winding and by the auxiliary winding. The machine can also run as a continuous current motor. According to one method the brush connections are the same as in Fig. 1. In this case the auxiliary winding should have about the same number of turns as the rotor circuit with the same magnetic axis, and the main winding should be adjusted so that it produces a field of a strength corresponding to the required number of revolutions of the motor. According to another method, the connections of one of each set of short circuit brushes may be broken, for instance of the brushes $B_2$ and $B_4$ and the rotor supplied with current by means of the brushes $B_1$ and $B_3$. But in that case the brushes $B_2$ and $B_4$ will be in a strong field and will therefore, if not taken off, give rise to sparking at the commutator. Therefore the former method is to be preferred to the latter. The current through the auxiliary winding may also be varied by means of a variable impedance, shown in Fig. 2, as an adjustable resistance RW and an adjustable reactance TW, either or both of which may be used. The impedance devices may be withdrawn from the circuit by removing the sliding contacts therefrom.

In Figs. 1 and 2 the main and auxiliary windings are represented as single coil windings; but they may be arranged as distributed windings. Electrically it is always advantageous to arrange the main winding S as a distributed winding, as in that case it conforms most nearly to the shape of the armature winding which is short circuited. For the same reason it is also advantageous that the auxiliary winding be arranged as a distributed one as it must oppose the exciting circuit of the rotor.

In Figs. 3 and 4 the same connections are shown as in Figs. 1 and 2 but arranged for a motor with three brushes. The main and auxiliary windings S and HW are represented as distributed windings.

Figs. 5 and 6 relate to shunt motors in which the rotor winding is connected in parallel to the main winding S. In the motor shown in Fig. 5 the auxiliary winding HW is connected in series with the main winding S. As the compensated shunt motor without auxiliary stator winding at starting takes a large current in the main winding S and a small one in the rotor it has only a small starting torque. When however the auxiliary winding is connected in series with the main winding a smaller current flows in the latter but a stronger cross field is produced, and since the starting torque is proportional to the cross field, it has a high value. With increasing speed the rotor reactance decreases and thus the shunt current increases; therefore the auxiliary winding can be gradually cut out. The latter may however also be used to vary the speed in the same way as with continuous current compound motors. In Fig. 6 the auxiliary winding is connected in series to the rotor winding. With this arrangement the starting torque is small. However the speed of the motor may be regulated over a wide range by varying the number of ampere turns of the auxiliary winding. If no auxiliary winding be used the shunt motor shown in Fig 6 will run at synchronous speed, and to run it at a lower speed the auxiliary winding must be connected in opposite direction to the rotor winding, while if a higher than synchronous speed is required, the auxiliary winding is connected in the same direction as the rotor winding; the more ampere turns of the auxiliary winding are used, the more the speed will differ from synchronism in the one or other sense. With shunt motors for high tension we need only to transform the current for the rotor and for the auxiliary winding to a convenient tension. To this end the main stator winding itself may be used as a transformer as shown in original Figs. 7 and 8, which were transferred to our divisional application, Serial No. 456,318, filed October 5, 1908.

What we claim as new, and desire to secure by Letters-Patent of the United States, is,

1. In an alternating current motor in combination, a rotor winding provided with a commutator, brushes bearing on said commutator, certain of said brushes connected to a source of current and forming the exciting circuit, at least two of said brushes short circuiting the rotor winding, to produce a magnetization at an angle to that of the exciting circuit, and forming the compensating circuit, a main stator winding arranged to produce a magnetization along the line of magnetization of the compensating circuit, and an auxiliary stator winding arranged to produce a magnetization along the line of magnetization of the exciting circuit.

2. In an alternating current motor in combination, a rotor winding provided with a commutator, brushes bearing on said commutator, certain of said brushes connected to a source of current and forming the exciting circuit, at least two of said brushes short circuiting the rotor winding, to produce a magnetization at an angle to that of the exciting circuit, and forming the compensating circuit, a main stator winding arranged to produce a magnetization along the line of magnetization of the compensating circuit, an auxiliary stator winding arranged to produce a magnetization along the line of magnetization of the exciting circuit, and means whereby the effective ampere turns of the auxiliary winding may be varied.

3. In an alternating current motor in combination, a rotor winding provided with a commutator, brushes bearing on said commutator, certain of said brushes connected to a source of current and forming the exciting circuit, at least two of said brushes short circuiting the rotor winding, to produce a magnetization at an angle to that of the exciting circuit, and forming the compensating circuit, a main stator winding arranged to produce a magnetization along the line of magnetization of the compensating circuit, an auxiliary stator winding arranged to produce a magnetization along the line of magnetization of the exciting circuit, and means whereby the ampere turns of the auxiliary winding may be reversed.

4. In an alternating-current motor in combination, a rotor-winding provided with a commutator, a stator winding having coils whose magnetic fields are in quadrature, brushes bearing on said commutator and connected in circuit with said stator coils on the line of one of said fields, and certain of said brushes connected together on the line of the other magnetic field, and means whereby the effective ampere turns of one stator coil may be varied and the direction of its magnetic field may be reversed.

5. In an alternating current motor in combination, a main stator winding, a rotor winding provided with a commutator, brushes bearing on said commutator, at least two of said brushes connected together on the line of magnetization of the main stator winding so as to set up a field to compensate said main stator winding, certain of said brushes connected to a source of current to form the exciting circuit and producing a magnetization at an angle to the main stator winding, and a starting and regulating stator winding arranged to produce a magnetization along the line of magnetization of the exciting circuit and connected in series circuit with the brushes of the exciting circuit.

6. In an alternating current motor in combination, a main stator winding, a rotor winding provided with a commutator, brushes bearing on said commutator, at least two of said brushes connected together on the line of magnetization of the main stator winding so as to set up a field to compensate the main stator winding, certain of said brushes connected in series with the main stator winding to a source of current to form the exciting circuit and producing a magnetization at an angle to the main stator winding, and a starting and regulating stator winding connected in series circuit with the main stator winding and the brushes of the exciting circuit and arranged to produce a magnetization along the line of magnetization of the exciting circuit.

7. In an alternating-current motor in combination, a rotor-winding provided with a commutator, a stator winding having coils whose magnetic axes are in quadrature, brushes bearing on said commutator and connected in circuit with said winding and producing with one of said coils a cross-field on the line of one of said axes, connections between certain of said brushes short-circuiting portions of said rotor-winding and producing a compensating field on the other magnetic axis, and means whereby the effective ampere turns of the stator coil on the line of the cross-field may be varied and the direction of its magnetic field may be reversed.

8. In an alternating current motor in combination, a rotor winding provided with a commutator, brushes bearing on said commutator, certain of said brushes connected to a source of current and forming the exciting circuit, at least two of said brushes short-circuiting the rotor winding, to produce a magnetization at an angle to that of the exciting circuit, and forming the compensating circuit, a main stator winding arranged to produce a magnetization along the line of magnetization of the compensating circuit, an auxiliary stator winding arranged to produce a magnetization along the line of magnetization of the exciting circuit, and a variable impedance shunting the auxiliary stator winding.

9. In an alternating-current motor in combination, a rotor-winding provided with a commutator, a stator winding having main and auxiliary coils forming magnetic fields arranged at an angle of ninety degrees to each other, brushes bearing on said commutator and connected in circuit with said stator coils on the line of one of said fields, certain of said brushes connected together on the line of the other magnetic field, and means whereby the effective ampere turns of the coil of the auxiliary field may be varied and the direction of its magnetic field may be reversed.

10. In a compensated alternating current motor in combination, a main stator winding, a rotor having a commutator, brushes bearing on the commutator, at least two of said brushes on the line of the main winding being short-circuited so as to set up a field to compensate the main stator-winding, an auxiliary stator-winding along the line of the rotor cross-field and in circuit with certain of said brushes, and means whereby the direction of the field set up by the auxiliary winding may be reversed.

11. In a compensated alternating-current motor in combination, a main stator-winding, a rotor having a commutator, brushes bearing on the commutator, at least two of said brushes on line of the main winding being short-circuited so as to set up a field to compensate the main stator-winding, an auxiliary stator-winding along the line of the rotor cross-field and in circuit with certain of said brushes, means whereby the direction of the field set up by the auxiliary winding may be reversed, and a resistance and an inductance in shunt with the auxiliary winding whereby its effective ampere turns may be varied.

12. In an alternating current motor, in combination, a stator, a rotor having a winding provided wth a commutator, brushes bearing on said commutator, said brushes short-circuiting the rotor winding on one axis and forming field brushes on an axis displaced from said short-circuited axis, said field brushes forming with said rotor winding a field circuit, a main stator winding on said short-circuited axis, and a field stator winding on the field axis of the rotor and in series circuit with the main stator winding.

In testimony whereof we have signed our names to this specification in the presence of subscribing witnesses.

ENGELBERT ARNOLD.
JENS LASSEN LA COUR.

Witnesses for Arnold:
  Jos. H. Leute,
  H. W. Harris.
Witnesses for La Cour:
  James Gardner,
  Frederick Piatt,
  Robert F. Scott.